No. 817,654. PATENTED APR. 10, 1906.
J. MINNICH.
FIRE SCREEN FOR LOCOMOTIVE FURNACES.
APPLICATION FILED JUNE 16, 1905.
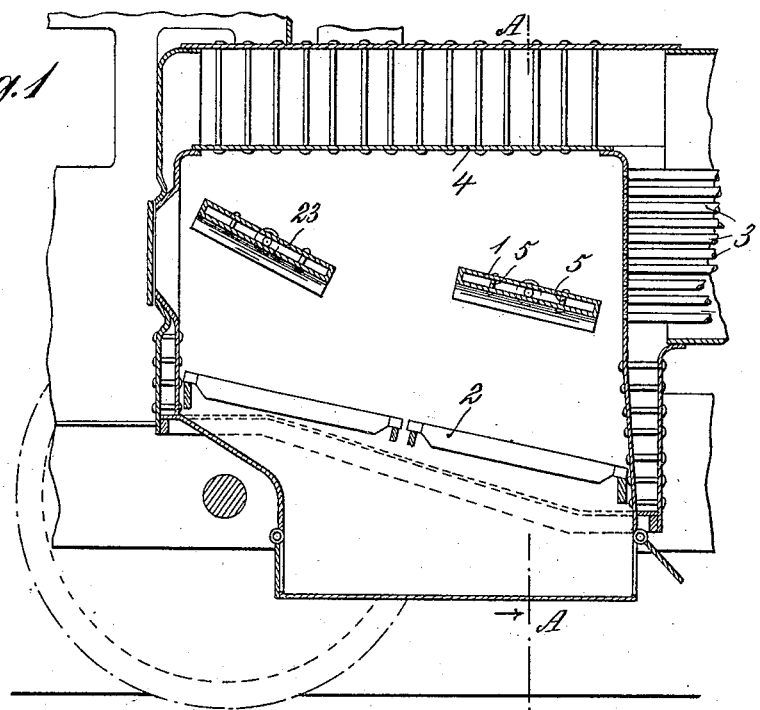
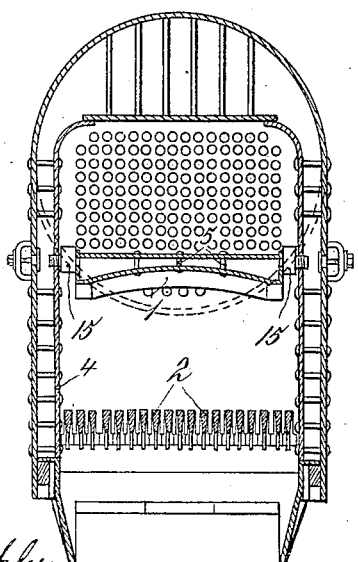
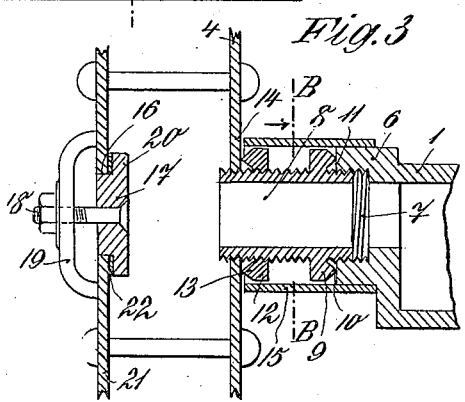

UNITED STATES PATENT OFFICE.

JOHANN MINNICH, OF RUMMELSBURG, NEAR BERLIN, GERMANY.

FIRE-SCREEN FOR LOCOMOTIVE-FURNACES.

No. 817,654.  Specification of Letters Patent.  Patented April 10, 1906.

Application filed June 16, 1905. Serial No. 265,541.

*To all whom it may concern:*

Be it known that I, JOHANN MINNICH, locomotive-driver, of Rummelsburg, 13 Kantstrasse, near Berlin, Kingdom of Prussia, Germany, have invented a new and useful Fire-Screen for Locomotive-Furnaces, of which the following is a specification.

It is a known design to arrange hollow turning fire-screens in locomotives. It is also no novel idea to connect the inside of the boiler with the hollow space of the fire-screen and to let the boiler-water circulate within the hollow of the screen.

The essential feature of the present invention is the connection of the inside of the boiler with the hollow of a turning fire-screen, the hollow pivot-pin being used for the purpose of obtaining such connection. Hereby it is made possible to vary the distance between fire-screen and grate-surface by turning the former so that the water passing through the screen is heated more or less and by this means the circulation of the water in the boiler is regulated.

In the accompanying drawings a mode of carrying out this new locomotive-furnace is shown.

Figure 1 is a vertical section through the furnace. Fig. 2 is a vertical section along the line A A in Fig. 1. Fig. 3 shows in a cross-section the joint of the fire-screen with the walls of the fire-box. Fig. 4 is a section along the line B B in Fig. 3.

The fire-screen 1 is arranged over the gate 2 with a suitable incline against the grate-surface and the boiler-tubes 3 inside the fire-box 4. As may been seen from Fig. 2, the fire-screen 1, which is suitably made of copper, is convex on its bottom side and level on the top. It is hollow inside and strengthened inside by stay-bolts 5.

The joint between the fire-screen 1 and the wall of the fire-box 4 must be such that it will allow the turning and tilting of the fire-screen and yet be perfectly water-tight. For this purpose (see Fig. 3) there can be arranged on the sides of the fire-screen 1 sleeve-like projections 6, which are provided with female threads 7. Into these sleeves 6 the hollow pins 8 are screwed, which are likewise screwed into the wall of the fire-box 4. On the outside of the hollow pin 8 is provided a hexagonal flange 9, which is best made in one piece with the hollow pin 8 and rests with its edge 10 on the end surface 11 of the fire-screen. By the coöperative action of the edge 10 and surface 11 the joint between the fire-screen 1 and the hollow pin 8 is tightened. The tightening of the joint between the hollow pin 8 and the fire-box 4 is obtained by the ring 12, screwed on the hollow pin 8 and also having a hexagonal outside shape, this ring resting with an edge 13 on the inside surface 14 of the fire-box 4. In order to avoid the bearings of the fire-screen being damaged by burning, &c., as far as possible, the bearing-pin is surrounded by a sleeve practically made in two halves, this sleeve 15 being fastened to the fire-screen 1.

The bearings of the fire-screen 1 are accessible from outside by opening 16, which may be closed in any desirable manner. In the design shown this is done by means of a plate 17, which is pressed by tightening the screw 18 by means of the hoop 19 with its flange 20 against the outside wall 21 of the fire-box 4. Between wall 21 and plate 17 a lining 22 may be inserted.

The fire-screen 1 can be turned and tilted. In this tilted position, in which the fire-screen affords access to the boiler-tubes 3, the connection between the interiors of the boiler and the fire-screen remains. This connection is thus not affected by the position of the fire-screen.

The water contained in the water-space of the fire-box 4 can by means of the hollow pin 8 enter the hollow of the fire-screen at any position of the latter, so that the walls of the fire-screen always are cooled, and thus protected against too rapid burning or damage. The water contained within the screen is further heated, as the walls of the fire-screen serve as heating-surface. Thus in a certain sense a rapid steam-generator is created. It will also be seen that by turning the fire-screen the distance between fire-screen and grate-surface is varied. Hereby the heating of the water passing through the fire-screen can be regulated, and as this water comes from the boiler the circulation in the boiler is regulated at the same time.

In order to reduce the smoking in the furnace over the front portion of the grate-surface 2, a second fire-screen 23 is arranged, which is suitably made in the same manner as the fire-screen 1.

Having thus described the nature of this my invention, I herewith declare that what I claim, and desire to secure by United States Patent, is—

1. In combination with a fire-box having a water-jacket to either side, a hollow screen, hollow pins for pivoting the screen to the walls of the fire-box, said pins communicating with the interior of the screen and with the water-jackets, and flanges carried by the pins bearing against the screen.

2. In combination with a fire-box having a water-jacket to either side, a hollow screen, hollow pins for pivoting the screen to the walls of the fire-box, said pins communicating with the interior of the screen and with the water-jackets, and collars on the pins adapted to bind against the walls of the fire-box.

In witness whereof I have hereunto set my hand in the presence of two witnesses.

JOHANN MINNICH.

Witnesses:
   HENRY HASPER,
   WOLDEMAR HAUPT.